(12) United States Patent
Luo et al.

(10) Patent No.: US 8,146,236 B1
(45) Date of Patent: Apr. 3, 2012

(54) METHOD FOR PROVIDING A PERPENDICULAR MAGNETIC RECORDING (PMR) TRANSDUCER

(75) Inventors: Guanghong Luo, Fremont, CA (US);
Liubo Hong, San Jose, CA (US);
Honglin Zhu, Fremont, CA (US);
Yun-Fei Li, Fremont, CA (US);
Yingjian Chen, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1041 days.

(21) Appl. No.: 12/057,692

(22) Filed: Mar. 28, 2008

(51) Int. Cl.
G11B 5/127 (2006.01)
H04R 31/00 (2006.01)

(52) U.S. Cl. ........ 29/603.16; 29/603.11; 29/603.13; 29/603.14; 29/603.15; 29/603.18; 360/121; 360/122; 360/317; 451/5; 451/41

(58) Field of Classification Search ........ 29/603.11, 29/603.13–603.16, 603.18; 360/121, 122, 360/317; 451/5, 41
See application file for complete search history.

(56) References Cited

U.S. PATENT DOCUMENTS

| | | | |
|---|---|---|---|
| 7,120,988 B2 | 10/2006 | Le et al. | |
| 7,441,325 B2* | 10/2008 | Gao et al. | 29/603.16 |
| 2007/0230046 A1 | 10/2007 | Le et al. | |
| 2007/0234878 A1 | 10/2007 | Lin et al. | |
| 2007/0235878 A1 | 10/2007 | Lin et al. | |
| 2007/0258167 A1 | 11/2007 | Allen et al. | |
| 2008/0145524 A1* | 6/2008 | Guthrie et al. | 427/131 |

* cited by examiner

Primary Examiner — Paul D Kim (57) ABSTRACT

A method and system for providing a perpendicular magnetic recording (PMR) transducer from pole layer(s) are disclosed. First and second planarization stop layers are provided on the pole layer(s). A mask is provided on the second planarization stop layer. A first portion of the mask resides on a portion of the pole layer(s) used to form the PMR pole. The PMR pole is defined after the mask is provided. An intermediate layer surrounding at least the PMR pole is provided. A first planarization is performed on at least the intermediate layer. A portion of the second planarization stop layer is removed during the first planarization. A remaining portion of the second planarization stop layer is removed. A second planarization is performed. A portion of the first planarization stop layer remains after the second planarization. A write gap and shield are provided on the PMR pole and write gap, respectively.

20 Claims, 11 Drawing Sheets

METHOD FOR PROVIDING A PERPENDICULAR MAGNETIC RECORDING (PMR) TRANSDUCER

BACKGROUND

Figure 1:
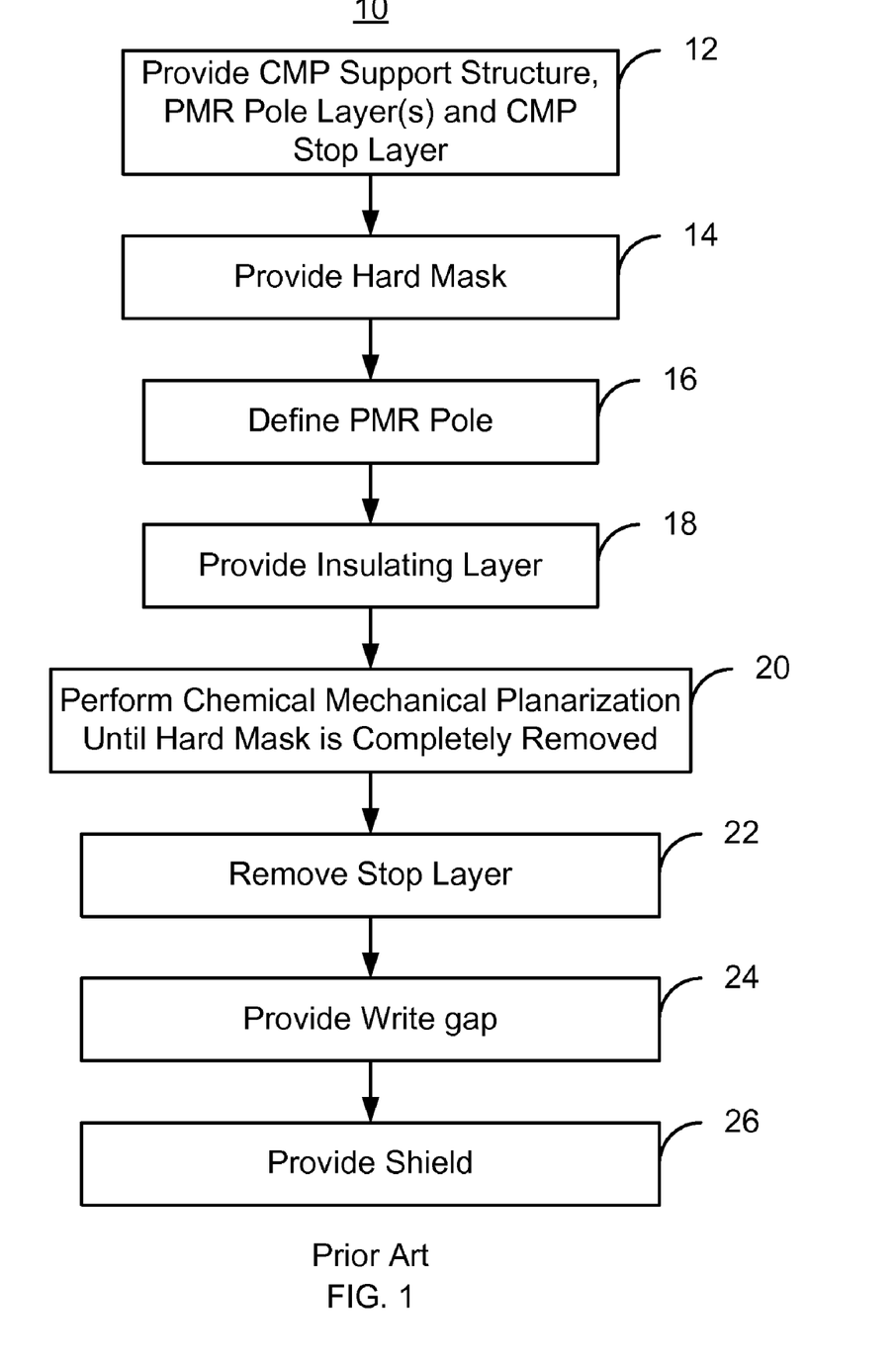
FIG. 1 is a flow chart depicting a conventional method for fabricating a PMR head.

FIG. 1 is a flow chart depicting a conventional method 10 for fabricating a PMR transducer. For simplicity, some steps are omitted. FIGS. 2-5 depict a conventional PMR transducer 50 formed using the method 10 as viewed from the air-bearing surface (ABS). The conventional PMR transducer 50 is formed using the conventional method 10. The conventional PMR transducer 50 may be part of a coupled with a slider to form a conventional PMR head. In addition, a read transducer (not shown) may be included to form a merged conventional PMR head. For simplicity, only a portion of the conventional PMR transducer 50 is shown.

Referring to FIGS. 1-5, the conventional chemical mechanical planarization (CMP) support structure, conventional PMR pole layers and CMP stop layer are provided, via step 12. The conventional CMP support structures are to attempt to aid in ensuring the CMP, described below, results in a relatively planar surface. Typically, the CMP support structure is between three and five microns from the PMR pole being formed. Thus, the CMP support structure may be in the device region and near the field regions between device regions. Typically, the CMP support structures are formed by milling a portion of the PMR pole layers that have been deposited, then refilling this region with the CMP support structure material, which is typically alumina. The conventional PMR pole layers may include a seed layer and one or more layers forming the magnetic portion of the conventional PMR pole. The conventional PMR pole layers reside on an underlayer, such as aluminum oxide or other nonmagnetic material. The conventional PMR pole layer(s) include magnetic materials suitable for use in the conventional PMR transducer. The conventional CMP stop layer follows the contour of the top surfaces of the PMR pole layers and the conventional CMP support structures. The conventional CMP stop layer may include materials such as diamond-like carbon (DLC).

Figure 2:
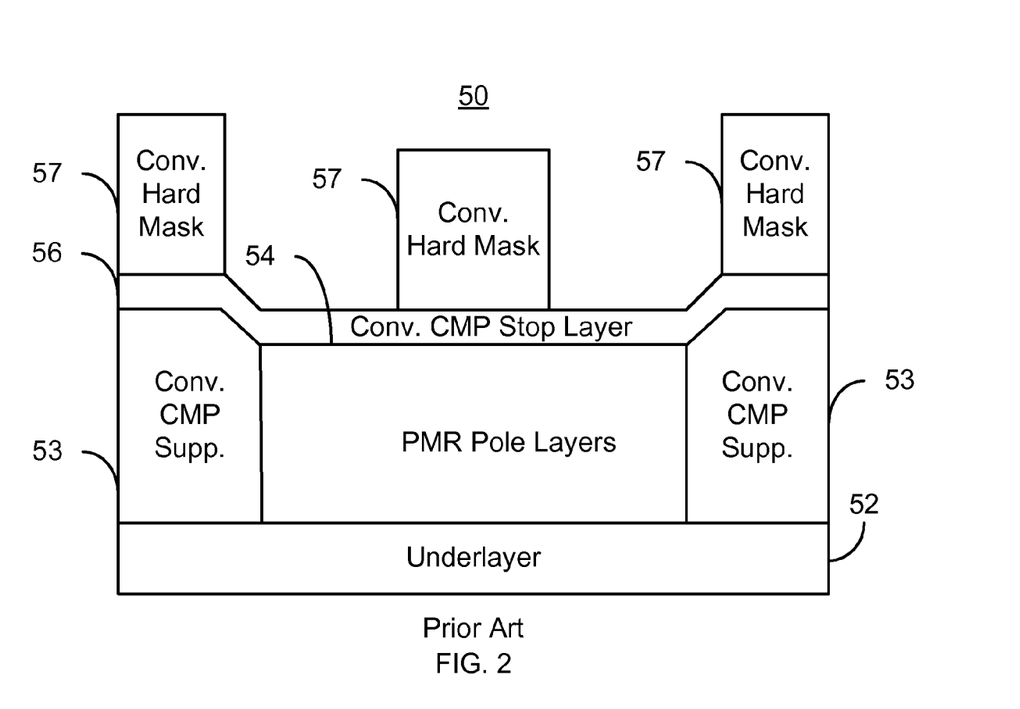
FIGS. 2-4 are diagrams depicting a conventional PMR transducer during fabrication.

A conventional hard mask is provided on the conventional CMP stop layer, via step 14. The conventional hard mask covers a portion of the PMR pole layers from which the conventional PMR pole is to be formed. The conventional hard mask may include materials such as NiFe. FIG. 2 depicts the conventional PMR transducer 50 after step 14 is performed. Consequently, an underlayer 52 on which the PMR pole layers 54 and conventional CMP support structure 53 are shown. Also depicted are the conventional CMP stop layer 56 and the conventional hard mask 57.

Figure 3:
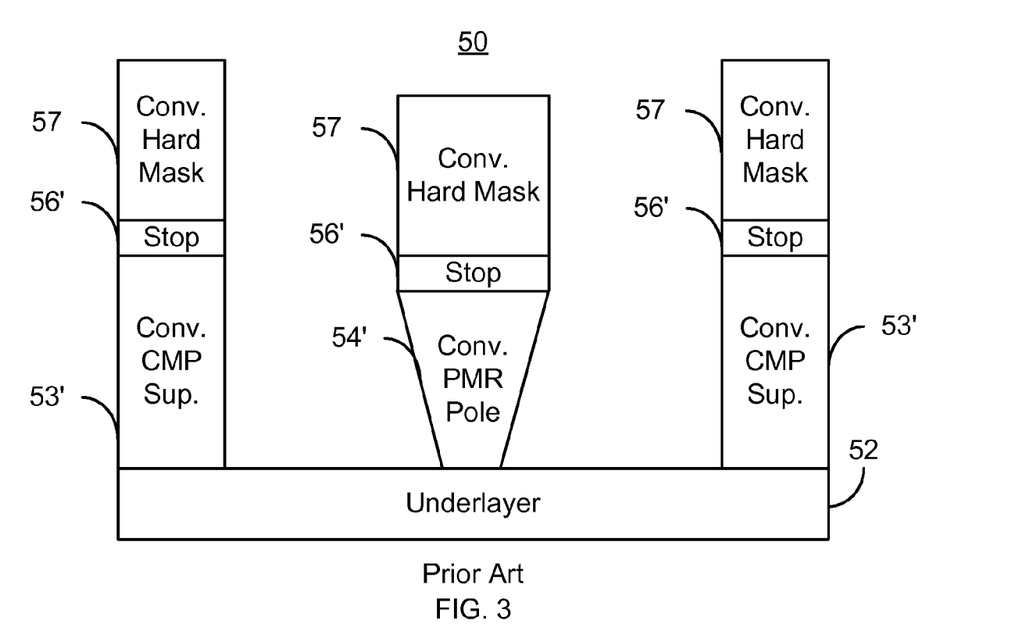

The conventional PMR pole is defined from the conventional PMR pole layers 54, via step 16. Step 16 typically includes performing an ion mill and a pole trim using the hard mask to expose the portion of the conventional PMR pole layer(s) to be removed. FIG. 3 depicts the conventional PMR transducer 50 after step 16 has been performed. Thus, the conventional PMR pole 54' has been formed. In addition, only a portion of the conventional CMP stop layer 56' and conventional CMP support structure 53' remain.

A conventional intermediate layer is provided, via step 18. The conventional intermediate layer is typically aluminum oxide that is blanket deposited on the conventional PMR transducer 50. A CMP is performed to completely remove the conventional hard mask 57, via step 20. The conventional CMP stop layer 56' is also removed, via step 22. Thus, the top surface is formed by portions of the intermediate layer and the conventional PMR pole. A write gap is deposited on the conventional PMR transducer and a shield is provided, via steps 24 and 26, respectively.

Figure 4:
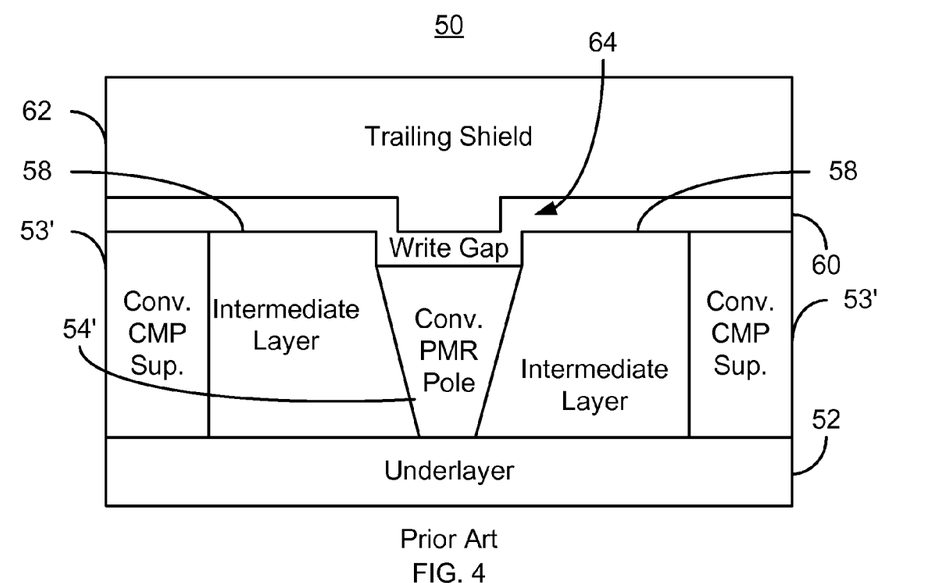

FIG. 4 depicts a conventional PMR transducer 50 after completion. Thus, the intermediate layer 58, write gap 60, and trailing shield 62 are shown. Also shown is a notch 62 in the shield 60 due to the topology of the conventional PMR transducer 50.

Although the conventional method 10 may provide the conventional PMR transducer 50, there may be drawbacks. In particular, as the critical dimensions of structures in the conventional PMR transducer 50 shrink to accommodate higher densities, tighter control may be desired for the structures in the conventional PMR transducer 50. Conventional methods, including the conventional method 10, may not provide the desired control over at least some portions of the conventional PMR transducer 50.

Figure 5:
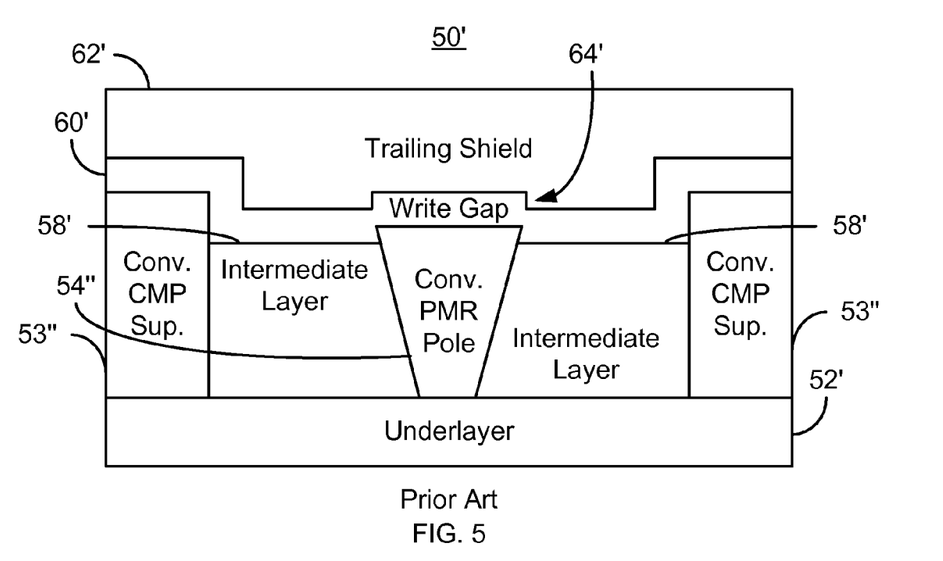
FIG. 5 is a diagram depicting another conventional PMR transducer during fabrication.

For example, some methods for forming the conventional PMR transducer 50 result in variations in the height of the notch 64. In the conventional PMR transducer 50, the notch 64 juts toward the conventional PMR pole 54'. However, in some cases, removal of the conventional hard mask 57 in step 20 removes a greater portion of the intermediate layer 58. FIG. 3 depicts a conventional PMR transducer 50' in which this has occurred. The conventional PMR transducer 50' is analogous to the conventional PMR transducer 50 and may be formed using the conventional method 10. Thus, the conventional PMR transducer 50' includes underlayer 52', conventional CMP support structures 53'', conventional PMR pole 54'', intermediate layer 58', write gap 60', and shield 62'. Because a greater portion of the intermediate layer 58' has been removed, the top surface of the intermediate layer 58' is lower than the top of the conventional PMR pole 54''. Moreover, a portion of the PMR pole 54'' may be inadvertently removed. Thus, when the write gap 60' and top shield 62' are provided in steps 24 and 26, the notch 64' is in the opposite direction from the notch 64. Consequently, the conventional method 10 might result in a notch 64, no notch, or a notch 64' in the reverse direction. Further, both the notch 64 and the notch 64' are abrupt. The conventional method for fabricating the conventional PMR transducer 50 may thus have relatively large variations in the conventional PMR transducer 50. Consequently, performance of the conventional PMR transducer 50/50' may vary.

Accordingly, what is needed is an improved method for fabricating a PMR transducer.

SUMMARY

A method and system for providing a perpendicular magnetic recording (PMR) transducer from pole layer(s) are disclosed. The method and system include providing a first planarization stop layer on the pole layer(s) and a second planarization stop layer on the first planarization stop layer. A mask is provided on the second planarization stop layer. A first portion of the mask resides on a portion of the pole layer(s) from which the PMR pole is formed. The method and system also include defining the PMR pole after the mask is provided. An intermediate layer surrounding at least the PMR pole is provided. The method and system further include performing a first planarization on at least the intermediate layer. At least a portion of the second planarization stop layer is removed during the first planarization. A remaining portion of the second planarization stop layer is also removed. A second planarization is performed. At least a portion of the first planarization stop layer remains after the second planarization is performed. The method and system further include providing a write gap on the PMR pole and providing a shield on the write gap. At least a portion of the write gap resides on the PMR pole.

DETAILED DESCRIPTION OF THE PREFERRED EMBODIMENTS

Figure 6:
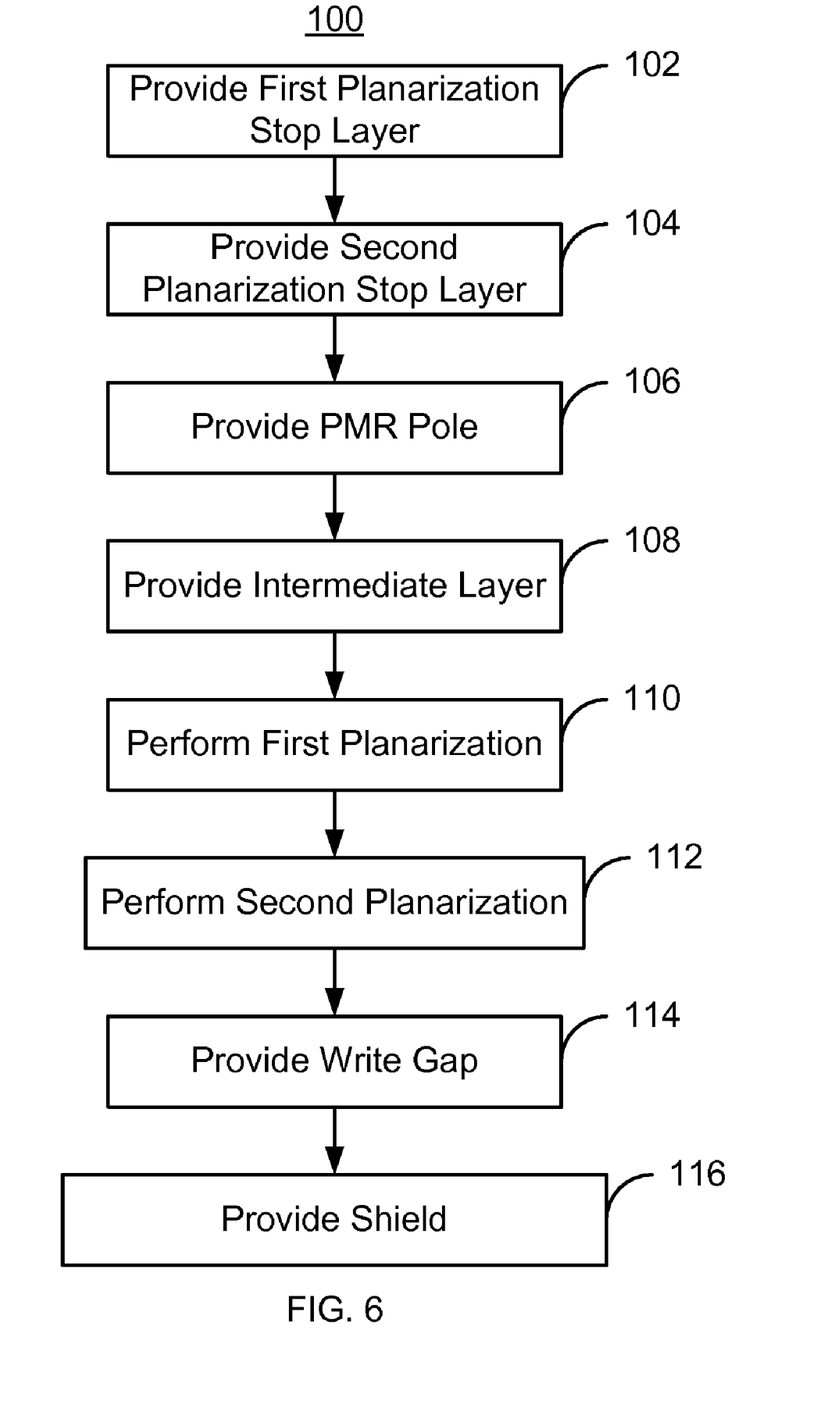
FIG. 6 is a flow chart depicting an exemplary embodiment of a method for fabricating a PMR transducer.

FIG. 6 is a flow chart depicting an exemplary embodiment of a method for fabricating a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 100 is also described in the context of providing a single PMR transducer. However, the method 100 may be used to fabricate multiple transducers at substantially the same time. The method 100 is also described in the context of providing particular layers. However, in one embodiment, a layer may include one or more sub-layers.

The method 100 commences after formation of one or more PMR pole layers. Thus, a seed layer for the PMR pole as well as one or more layers making up the PMR pole may be provided prior to the method 100. A first planarization stop layer is provided on the pole layer(s), via step 102. In one embodiment, the first planarization stop layer includes at least one of Ru, Ta, and Ti. The thickness of the stop layer may be at least five nanometers. In one embodiment, the thickness of the first planarization stop layer is not more than twenty nanometers. In another embodiment, the thickness is not more than ten nanometers. The first planarization stop layer may be provided directly on the PMR pole layer(s). Alternatively, another layer may be interposed between the PMR pole layer(s) and the first planarization stop layer. For example, in one embodiment, the write gap, discussed below, may be provided before step 102. In such an embodiment, the first planarization stop layer may be provided on the write gap layer. In one embodiment, no planarization support structures are used and the first planarization stop layer blanket deposited. In such an embodiment, therefore, the first planarization stop layer is substantially flat.

A second planarization stop layer is provided on the first planarization stop layer, via step 104. Materials that might be used for the second planarization stop layer include diamond-like carbon (DLC) and/or SiC. In one embodiment, the thickness of the second planarization stop layer is at least thirty nanometers. In one embodiment, the thickness of the second planarization stop layer is not more than seventy nanometers. Thus, the second planarization stop layer may be significantly thicker than the first planarization stop layer. Like the first planarization stop layer, where no planarization support structures are used, the second planarization stop layer may be substantially flat.

The PMR pole is defined from the PMR pole layers, via step 106. Step 106 typically includes providing a mask on the second planarization stop layer. In one embodiment, a hard mask is used. In another embodiment, another mask might be utilized. A first portion of the mask resides on a portion of the PMR pole layer(s) from which the PMR pole is formed. In one embodiment, another portion of the magnetic transducer distal from desired location of the PMR pole is also covered. For example, at least a portion of the field region(s) may be covered. The PMR pole may then be defined by removing a portion of the PMR pole layer(s). For example, an ion mill followed by a pole trim might be used. Such a removal step also removes exposed portions of the first and second planarization stop layers. An intermediate layer is also provided, via step 108. The intermediate layer substantially surrounds the PMR pole. The intermediate layer also surrounds the first and second planarization stop layers in the region of the PMR pole. In one embodiment, the intermediate layer includes alumina.

A first planarization is performed on at least the intermediate layer, via step 110. The second planarization stop layer is configured to acts as a stop layer for this first planarization. Consequently, at least a portion of the second planarization stop layer is removed during the first planarization. In one embodiment, a portion of the second planarization stop layer remains after the first planarization is terminated. In such an embodiment, a remaining portion of the second planarization stop layer is removed after termination of the planarization. For example, a reactive ion etch (RIE) may be performed to remove DLC used as the second planarization stop layer. In another embodiment, the second planarization stop layer may be completely removed. The first planarization may be a chemical mechanical planarization. Furthermore, the first planarization is robust. For example, a CMP performed in step 110 may be performed at a pressure of at least three pounds per square inch (psi).

A second planarization is performed, via step 112. At least a portion of the first planarization stop layer remains after the second planarization is performed. The second planarization is thus terminated while some portion of the first planarization stop layer still remains on the PMR transducer. In one embodiment, the second planarization is terminated when the first planarization stop layer has a thickness of at least three nanometers and not more than ten nanometers. In one embodiment, the second planarization is a CMP. The second planarization is also significantly more gentle than the first CMP. For example, the second planarization may be performed at a pressure of not more than three psi. The pressure may also be at least one psi. In one such embodiment, the pressure is at least one and not more than one and one-half psi. Similarly, the second planarization may be performed with a less abrasive slurry than the first planarization. For example, the first planarization might be performed with a first slurry. The second planarization performed in step 112 may utilize a second slurry. This second slurry could be a dilution of the first slurry. For example, the concentration of the first slurry could be diluted by a factor of at least a 1:5 dilution. Thus, a 1:5 dilution might be used. In another embodiment, the concentration may be further diluted. In one embodiment, the first slurry would be diluted by a factor of not more than 1:30. Because the second planarization performed in step 112 is gentler than the first planarization of step 110, the removal rates differ. For example, the first planarization may have a first removal rate for removing the intermediate layer. The second planarization has a second removal rate that is less than the first removal rate. In one embodiment, the second removal rate is not more than ⅕ of the first removal rate. Thus, the second planarization would remove the intermediate layer five times more slowly than the first planarization. In one embodiment, the second removal rate is not less than 1/30 of the first removal rate.

A write gap on the PMR pole, via step 114. At least a portion of the write gap resides on the PMR pole. In one embodiment, step 114 may be performed prior to step 102. Thus, the write gap would reside directly on the PMR pole. The first planarization stop layer would reside on the write gap. In such an embodiment, portions of the layer forming the write gap would be removed, for example in step 106. In such an embodiment, the write gap would have edges substantially at the tops of the sidewalls of the PMR pole. However, in an embodiment in step 14 is performed after the planarizations of steps 110 and 112. In such an embodiment, the write gap may extend beyond the edges of the PMR pole. A shield is provided on the write gap, via step 116.

Using the method 100, a PMR transducer may be fabricated. Because two planarizations having different characteristics and utilizing two different stop layers are performed, the amount of the intermediate layer removed is better controlled. For example, it has been determined that use of conventional CMP support structures result in an uneven surface for the conventional CMP stop layers used. As a result, the CMP performed in the conventional method 10 may be inconsistent. In contrast, the method 100 need not utilize CMP support structures. Instead, the surfaces of the first and second planarization layers are substantially flat in the device region. This feature in combination with the use of multiple planarizations in steps 110 and 112 better controls the amount of the intermediate layer removed. As a result, the shield may have little or no notch. Stated differently, the size and presence of a notch in the shield may be controlled. Performance of the PMR transducer may thus be improved.

Figure 7:
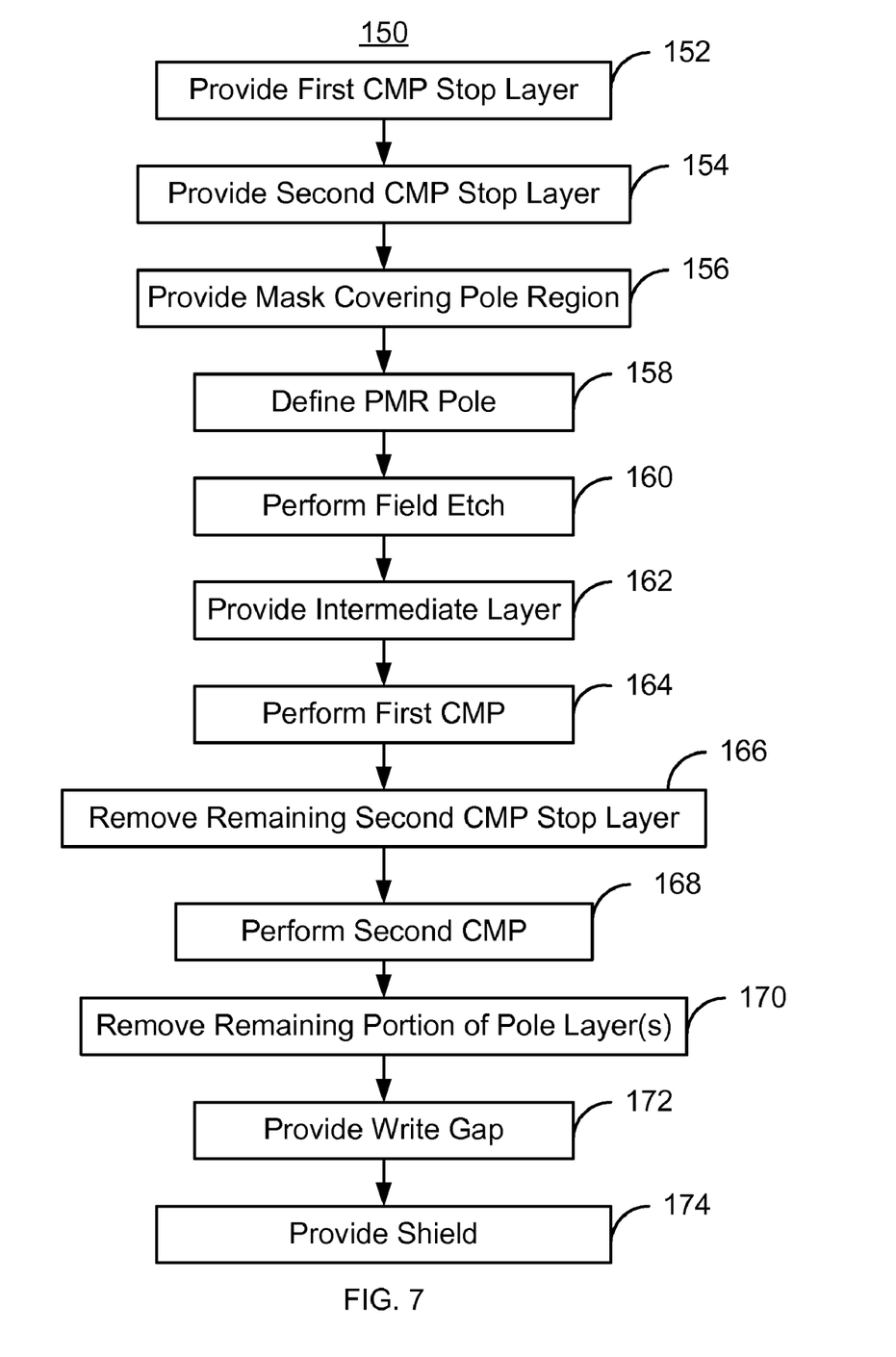
FIG. 7 is a flow chart depicting another embodiment of a method for fabricating a PMR head.

FIG. 7 is a flow chart depicting another embodiment of a method 150 for fabricating a PMR head. For simplicity, some steps may be omitted or combined.

FIGS. 8-17 are diagrams depicting an exemplary embodiment of a PMR transducer 200 during fabrication. The PMR transducer 200 may be part of a merged head that also includes a read head (not shown) and resides on a slider (not shown). The method 150 also may commence after formation of other portions of the PMR transducer 200. The method 150 is also described in the context of providing a single PMR transducer. However, the method 150 may be used to fabricate multiple transducers at substantially the same time. The method 100 is also described in the context of providing particular layers. However, in one embodiment, a layer may include one or more sub-layers.

A first CMP stop layer is provided on the pole layer(s), via step 152. Step 152 is analogous to step 102 of the method 100 depicted in FIG. 6. Referring back to FIGS. 7-17, in one embodiment, the first planarization stop layer includes at least one of Ru, Ta, and Ti. A second CMP stop layer is provided on the first CMP stop layer, via step 154. Step 154 is analogous to step 104 of the method 100 of FIG. 6. Referring back to FIGS. 7-17, materials that might be used for the second planarization stop layer include DLC and/or SiC.

Figure 8:
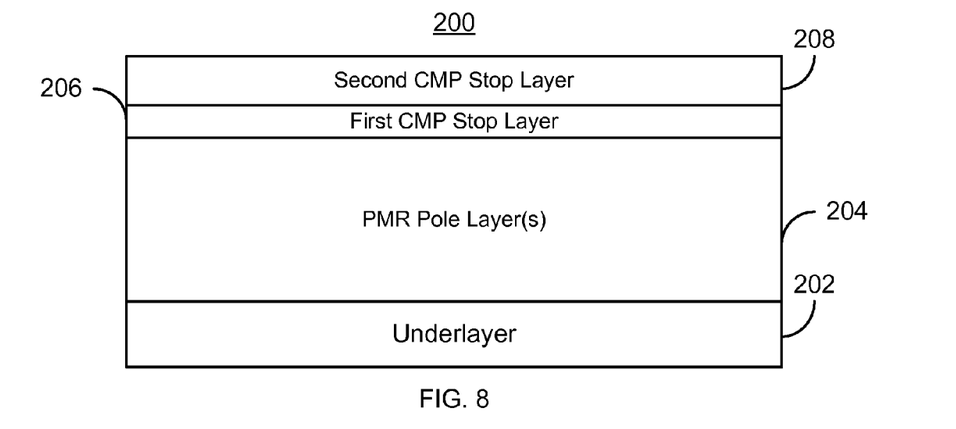
FIGS. 8-17 are diagrams depicting an exemplary embodiment of a perpendicular magnetic recording head during fabrication.

FIG. 8 depicts the PMR transducer 200 after step 104 is performed. Consequently, an underlayer 202 and PMR pole layers 204 are shown. The PMR pole layer(s) 204 may include seed layers as well as one or more layers used to form the PMR pole itself. The first CMP stop layer 206 and second CMP stop layer 208 are also shown. The first CMP stop layer 206 may be at least five nanometers thick. In one embodiment, the thickness of the first CMP stop layer 206 is not more than twenty nanometers. In another embodiment, the first CMP stop layer 206 is not more than ten nanometers thick. In one embodiment, the thickness of the second CMP stop layer 208 is at least thirty nanometers. In one embodiment, the second CMP stop layer 208 is not more than seventy nanometers thick. Thus, the second CMP stop layer 208 may be significantly thicker than the first CMP stop layer 206. In the embodiment shown, the first CMP stop layer 206 is provided directly on the PMR pole layer(s) 204. Alternatively, another layer may reside between the PMR pole layer(s) 204 and the first CMP stop layer 206. For example, in one embodiment, the write gap, discussed below, may be provided before step 152. In such an embodiment, the first CMP stop layer 206 may be provided on the write gap layer. In one embodiment, no CMP support structures are used. The first CMP stop layer 206 is, therefore, substantially flat. Like the first planarization stop layer, where no CMP support structures are used, the second CMP stop layer 208 may be substantially flat.

Figure 9:
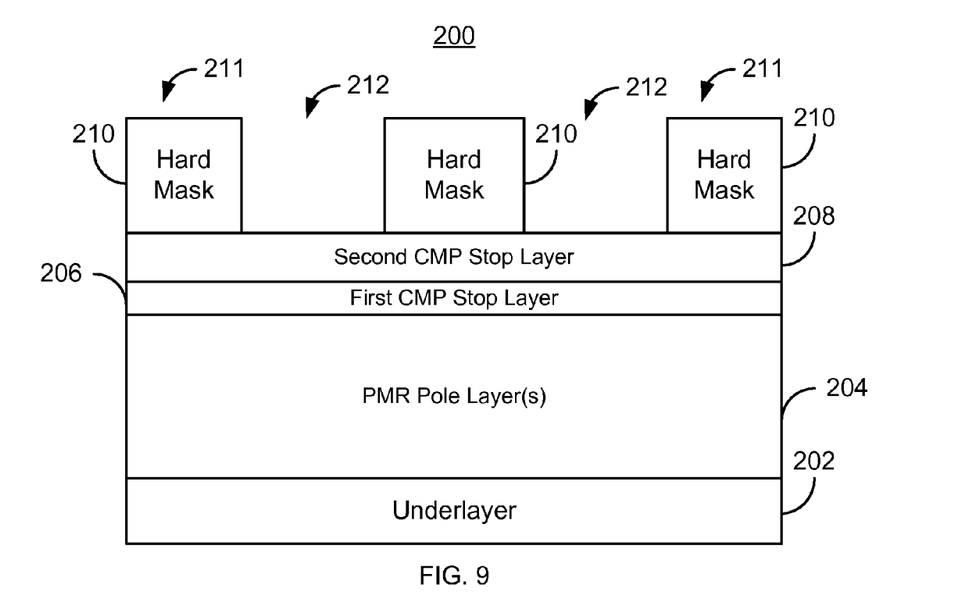

A mask is provided on the second CMP stop layer 208, via step 156. A portion of the mask covers the pole region. Thus, this portion of the mask resides on a portion of the pole layer(s) from which the PMR pole is formed. In one embodiment, the mask is a hard mask. FIG. 9 depicts the PMR transducer 200 after step 156 is performed. Thus, a hard mask 210 including apertures 212 has been provided. In addition to covering the pole region, portions of the hard mask 210 cover regions 211 distal from the pole region. In one embodiment, the regions 211 include at least a part of the field regions. For example, in one embodiment, the apertures 212 may be on the order of three to five microns or more wide.

Figure 10:
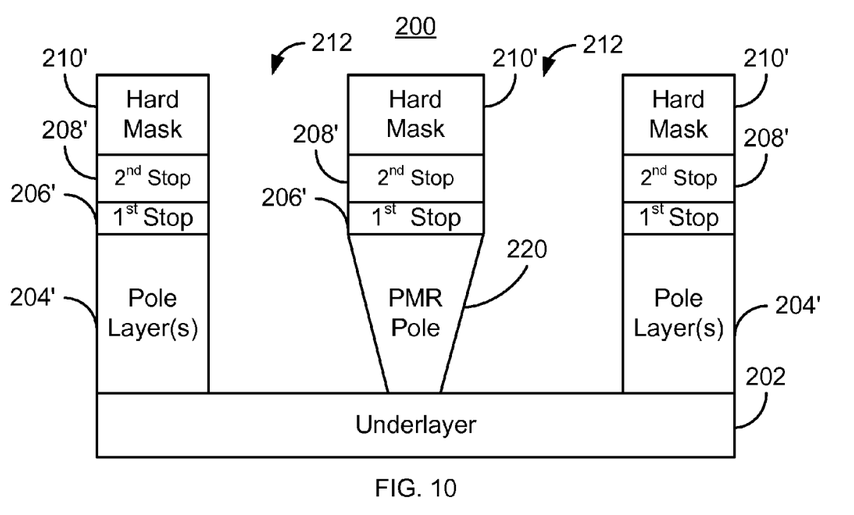

The PMR pole is defined using the hard mask 210, via step 158. In one embodiment, step 158 includes performing an ion mill as well as a pole trim. FIG. 10 depicts the PMR transducer 200 after step 158 is performed. Thus, the PMR pole 220 has been formed from pole layers 204. In addition, portions 204' of the pole layer 204 remain distal from the PMR pole 220. In addition, exposed portions of the first CMP stop layer 206 and the second CMP stop layer 208 are removed. Consequently, remaining portions 206' and 208' of the CMP stop layers remain. In addition, the exposed portion of the underlayer 202 may be removed in step 158. However, for simplicity, the underlayer 202 is depicted as unchanged by step 158 in FIGS. 10-18.

Figure 11:
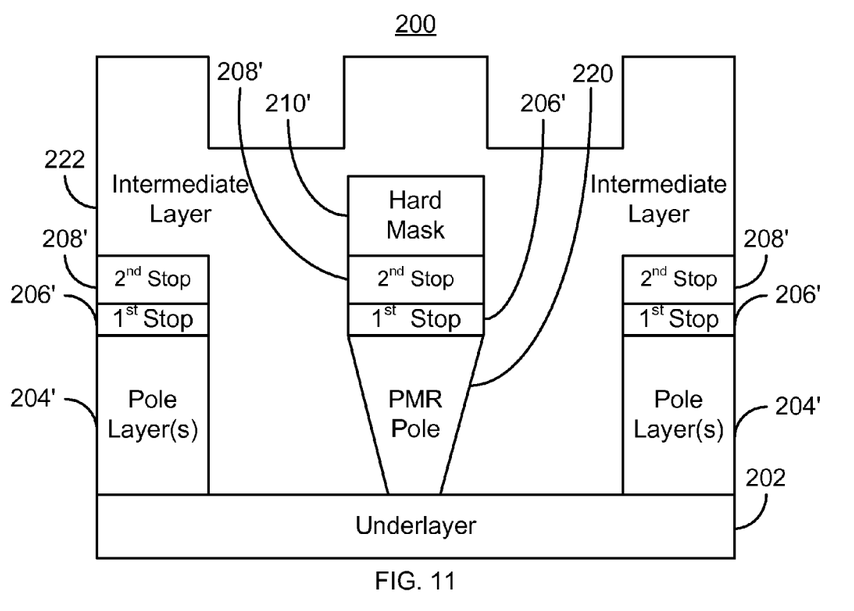

The remaining portions of the hard mask 210' distal to the PMR pole 220 are removed, via step 160. In one embodiment, a field etch is performed in step 160. An intermediate layer is provided on the PMR pole, via step 162. In one embodiment, step 162 includes depositing a layer of alumina. FIG. 11 depicts the PMR transducer 200 after step 162 is performed. Because of the field etch, remaining portions of the hard mask 210' in the field have been removed. However, a portion of the hard mask 210' remains above the PMR pole 220. The intermediate layer 222 has also been provided. The intermediate layer 22 substantially surrounds at least the PMR pole 220. As can be seen, in FIG. 11, there are variations in the top surface of the intermediate layer 220.

Figure 12:
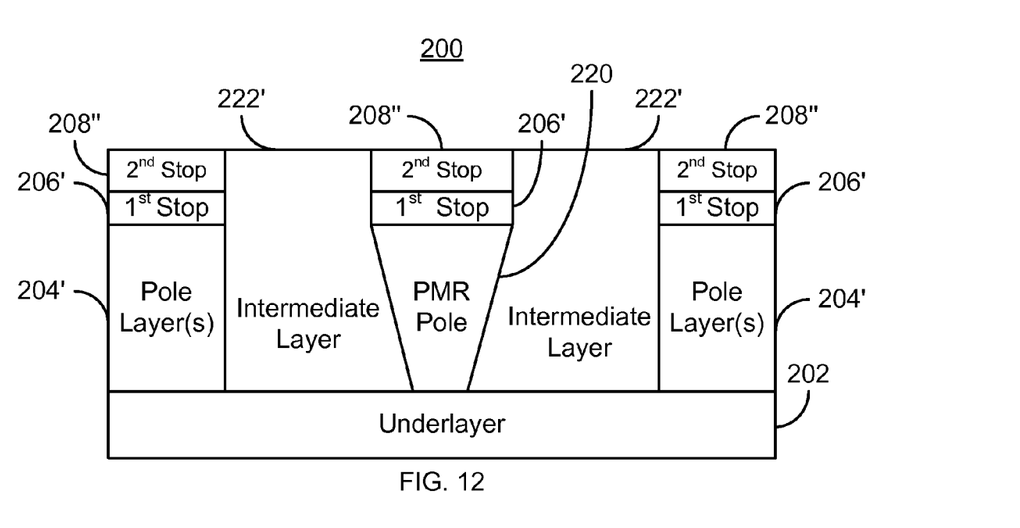

A first CMP is performed, via step 164. The first CMP is performed on at least the intermediate layer 220. The second CMP stop layer 208' is configured to acts as a stop layer for this first CMP. Consequently, although a portion of the second CMP stop layer 208' is removed during the first CMP, a portion of the second CMP stop layer 208' may remain. Furthermore, the first planarization is robust. For example, the CMP performed in step 164 may be performed at a pressure of at least three psi. FIG. 12 depicts the PMR transducer 200 after step 164 is performed. A portion of the intermediate layer 222 and second CMP stop layer 208' have been removed. Thus, intermediate layer 222' and portions of the second CMP stop layer 208" remain. Because the portions of the second stop layer 208" are formed from a single layer that is substantially flat, the top surface of the PMR transducer is substantially flat after step 164 is performed. In other words, the top surfaces of the intermediate layer 222' and portions 208" of the second CMP stop layer are at substantially the same height.

Figure 13:
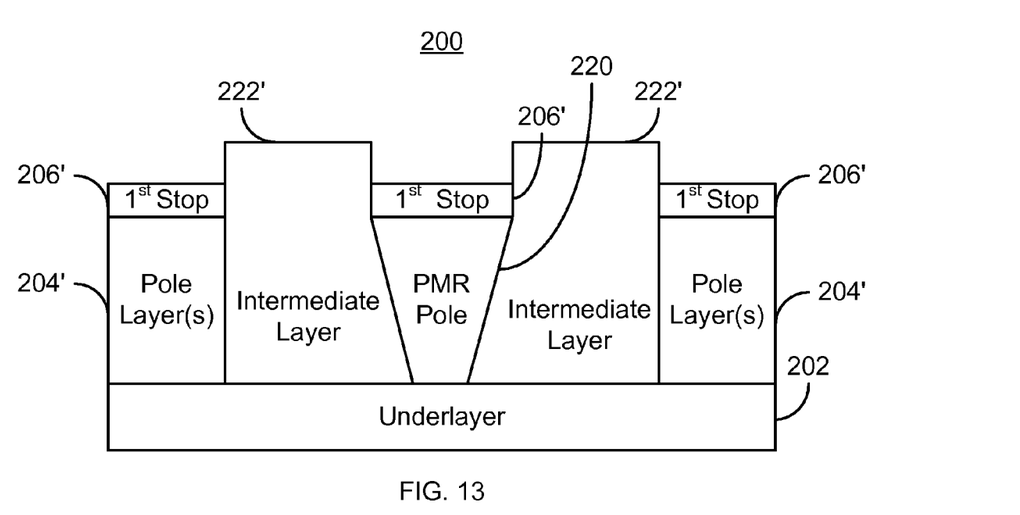

The remaining portions 208" of the second CMP stop layer is removed, via step 166. In one embodiment, step 166 includes performing a RIE, for example to remove DLC. FIG. 13 depicts the PMR transducer 200 after step 166 is performed. Thus, the first CMP stop layer 206' has been exposed. However, because the intermediate layer 222' is not substantially removed during step 166, the top surface of the intermediate layer 222 may be higher than the top surface of the first CMP stop layer 206'. However, the difference in the heights may be small, on the order of the thickness of the remaining portion of the second CMP stop layer 208".

Figure 14:
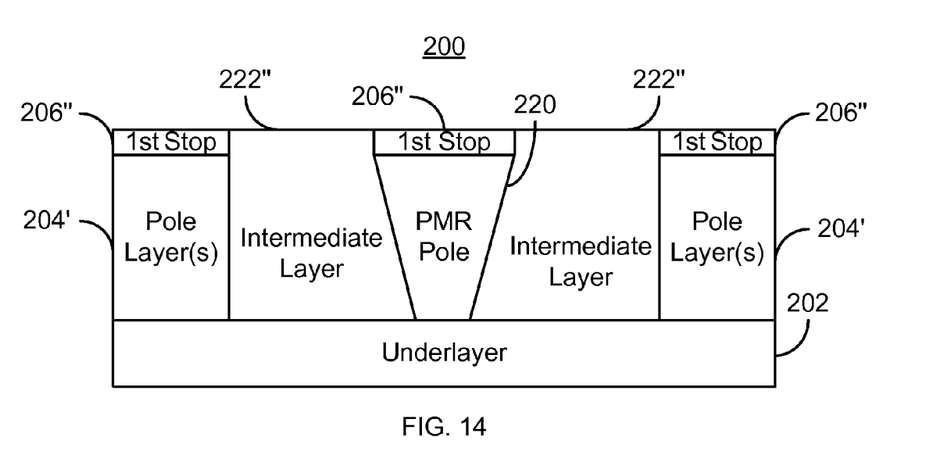

A second CMP is performed, via step 168. The second CMP may be significantly gentler than the first CMP. For example, the second CMP may be performed at a pressure of not more than three psi. The pressure may also be at least one psi and not more than one and one-half psi. Similarly, the second CMP may be performed with a less abrasive slurry than the first CMP. For example, the second CMP may be performed with a dilute slurry as described above for step 112. In one embodiment, the first slurry used for the first CMP would be diluted by a factor of at least 1:5 and not more than 1:30 to form the second slurry used in the second CMP. Because the second CMP of step 168 is more gentle than the first planarization of step 164, the removal rates differ. For example, the first CMP may have a first removal rate for removing the intermediate layer. The second CMP has a second removal rate that is less than the first removal rate. In one embodiment, the second removal rate is not more than ⅕ of the first removal rate. In one embodiment, the second removal rate is not less than 1/30 of the first removal rate. FIG. 14 depicts the PMR transducer 200 after step 168 is performed. The top surface of the intermediate layer 222" is thus at the same level as the remaining portions 206" of the first CMP stop layer. A portion of the first CMP stop layer 208' has been removed. At least a portion 208" of the first CMP stop layer remains after the second CMP is performed. The second CMP is thus terminated while some portion 208" of the first CMP stop layer still remains on the PMR transducer. In one embodiment, the second CMP is terminated when the first CMP stop layer 208" has a thickness of at least three nanometers and not more than ten nanometers.

Figure 15:
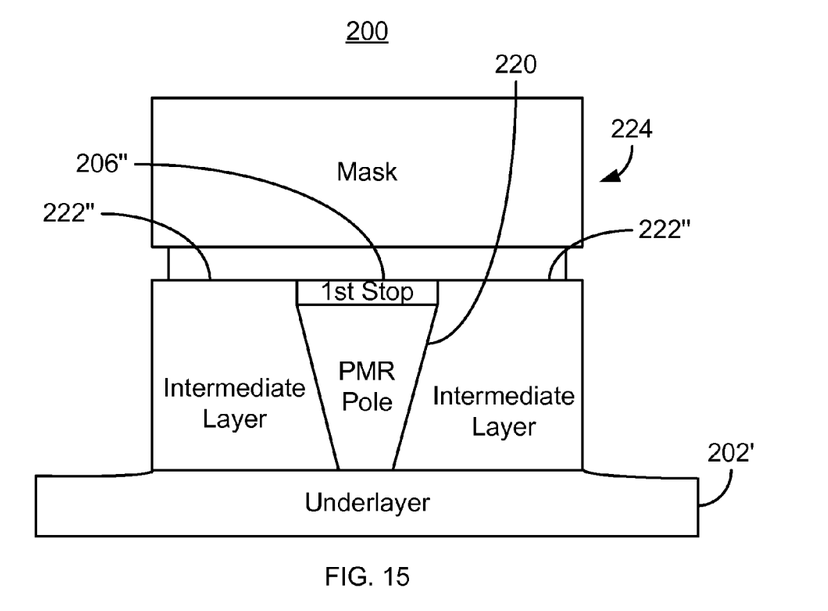
Figure 16:
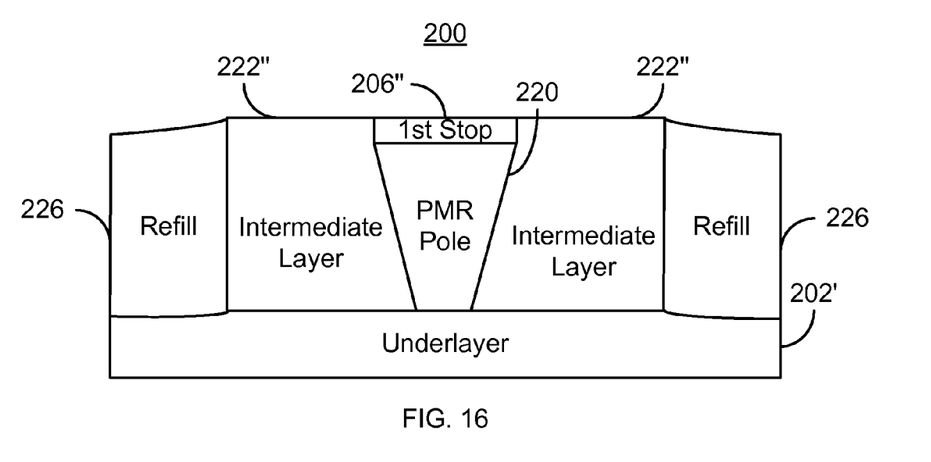

The remaining portions 204' of the pole layer(s) are removed, via step 170. In one embodiment, step 170 includes masking the device region of the PMR transducer and performing a mill. FIG. 15 depicts the PMR transducer 200 after the portions 204' are removed. Consequently, a mask 224 used in removing the pole layer(s) 204' is depicted. In one embodiment, the mask 224 is a resist mask. As a result of the removal, a portion of the underlayer 202 may have been removed. Consequently, the underlayer 202' remains. Also in step 170, these portions are refilled, for example using alumina. In addition, the mask 224 may be removed as part of step 170. FIG. 16 depicts the PMR transducer 200 after step 170 is completed. Thus, a refill 226 has been provided. In addition, the top surface of the remaining portion 206" of the first CMP stop and the top surface of the intermediate layer 222" are exposed.

Figure 17:
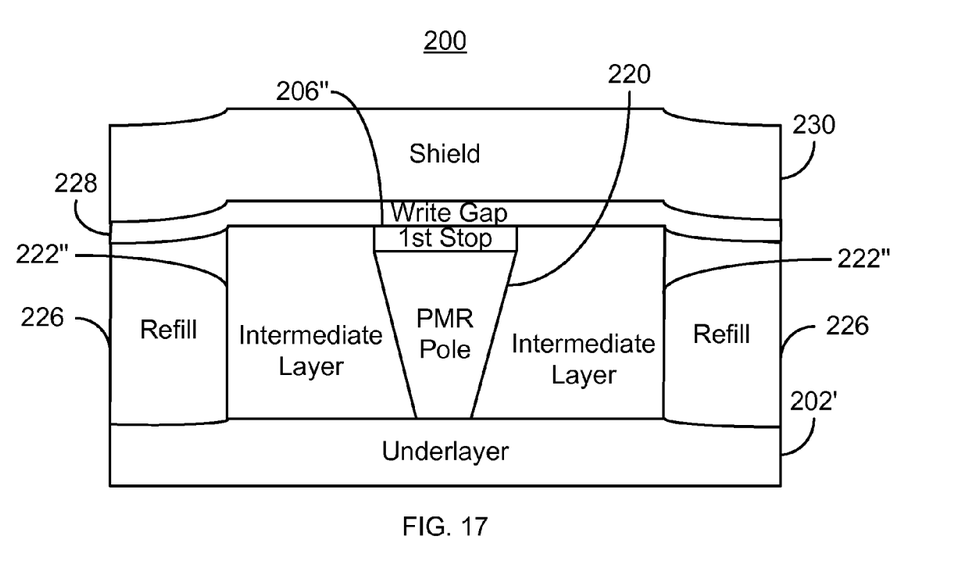

A write gap is provided on the PMR pole, via step 172. In one embodiment, the write gap is blanket deposited. In one embodiment, the write gap is provided after step 170. Such an embodiment is depicted in FIG. 17. Thus, the write gap 228 is shown as residing on both the intermediate layers and the PMR pole 220. In addition, the write gap is shown as extending further than the edges of the PMR pole 220. However, in another embodiment, the write gap 228 may cover a smaller portion of the PMR transducer 200. For example, in one embodiment, the write gap may be provided after step 168 and before step 170. In such an embodiment, the write gap may be blanket deposited. However, in step 170, the portion of the write gap exposed by the mask 224 may be removed.

A shield is provided on the write gap, via step 174. In one embodiment, in which step 172 is performed after step 168, the shield would reside on the write gap 228. Such an embodiment is shown in FIG. 17. In the pole region, the write gap 228 and the shield 230 are substantially flat. In addition, the shield 230 resides directly on the write gap 228. Near the PMR pole 220, in the pole or device regions, the bottoms of the shield 230 and write gap 228 are substantially flat. However, distal from the pole, the bottom surfaces of the shield 228 and write gap 228 may bow toward the underlayer 202'. In particular, portions of the shield 230 distal from the PMR pole 220 may be closer to the bottom of the underlayer 202' than portions of the shield 230 near the PMR pole 220.

Figure 18:
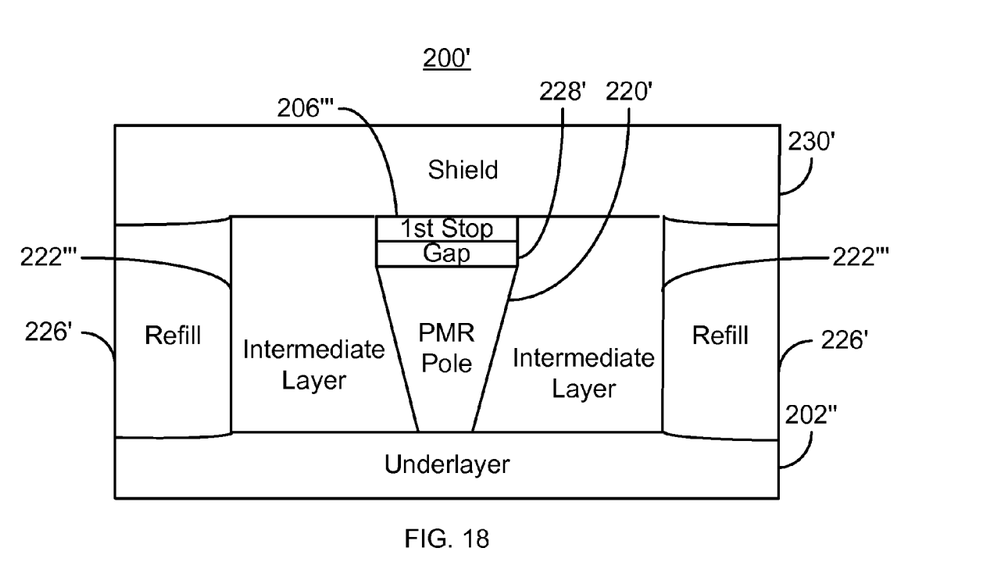
FIG. 18 is a diagram depicting another exemplary embodiment of a perpendicular magnetic recording head during fabrication.

In the embodiments shown in FIG. 17, the write gap 228 is provided after the first CMP stop layer 206". However, in another embodiment, the write gap may be provided earlier. FIG. 18 is a diagram depicting another exemplary embodiment of a PMR transducer 200' during fabrication. The PMR transducer 200' is analogous to the PMR transducer 200. Consequently, similar structures have analogous labels. The PMR transducer thus includes an underlayer 202", intermediate layer 222''', refill 226', PMR pole 220', gap 228', first CMP stop layer 206''' and shield 230'. Because the write gap 228' is provided as a layer before the first CMP stop layer 206, portions (not shown) of the write gap 228' not covered by the hard mask 210' may be removed. In addition, portions (not shown) of the write gap 228 may be removed in step 170. Thus, in the embodiment shown, only the portion of the write gap 228' directly above the PMR pole 220' remains. In addition, portions of the shield 230' distal from the PMR pole 220' may still be closer to the bottom of the underlayer 202" than portions of the shield 230' near the PMR pole 220'.

Using the method 150, the PMR transducer 200 and/or 200' may be fabricated. Because two planarizations having different characteristics and utilizing two different stop layers 206 and 208 are performed, the amount of the intermediate layer 222 removed is better controlled. As a result, the shield 230' may have little or no notch. Stated differently, the size and presence of a notch in the shield may be controlled. Performance of the PMR transducer 200 may thus be improved.

We claim:

1. A method for providing a perpendicular magnetic recording (PMR) transducer including a PMR pole formed from at least one pole layer, the method comprising;

providing a first planarization stop layer on the at least one pole layer;

providing a second planarization stop layer on the first planarization stop layer;

providing a mask on the second planarization stop layer, a first portion of the mask residing on a portion of the at least one pole layer from which the PMR pole is formed;

defining the PMR pole after the mask is provided;
providing an intermediate layer, the intermediate layer surrounding at least the PMR pole;
performing a first planarization on at least the intermediate layer, at least a portion of the second planarization stop layer being removed during the first planarization;
removing a remaining portion of the second planarization stop layer;
performing a second planarization, at least a portion of the first planarization stop layer remaining after the second planarization is performed;
providing a write gap, at least a portion of the write gap residing on the PMR pole; and
providing a shield on the write gap.

2. The method of claim 1 wherein the first planarization is a chemical mechanical planarization.

3. The method of claim 2 wherein the step of performing the first planarization further includes:
performing the first planarization at a pressure of at least three pounds per square inch.

4. The method of claim 1 wherein the second planarization is a chemical mechanical planarization.

5. The method of claim 4 wherein the step of performing the second planarization further includes:
performing the second planarization at a pressure of not more than three pounds per square inch.

6. The method of claim 5 wherein the pressure is at least one pound per square inch.

7. The method of claim 1 wherein the step of performing the first planarization is performed with a first slurry and the step of performing the second planarization is performed using a second slurry, the second slurry being at least a 1:5 and not more than a 1:30 dilution.

8. The method of claim 1 wherein the first planarization has a first removal rate and the second planarization has a second removal rate of not more than $1/5$ of the first planarization rate.

9. The method of claim 8 wherein the second planarization rate is not less than $1/30$ of the first planarization rate.

10. The method of claim 1 wherein the first planarization stop layer includes at least one of Ru, Ta, and Ti.

11. The method of claim 10 wherein the step of providing the first planarization stop layer further includes:
providing the first planarization stop layer having a thickness of at least five and not more than twenty nanometers.

12. The method of claim 11 wherein the thickness is not more than ten nanometers.

13. The method of claim 1 wherein the step of performing the second planarization further includes:
terminating the second planarization when the first planarization stop layer has a thickness of at least three and not more than ten nanometers.

14. The method of claim 1 wherein the second planarization stop layer includes at least one of diamond-like carbon and SiC.

15. The method of claim 14 wherein the step of providing the first planarization stop layer further includes:
providing the second planarization stop layer having a thickness of at least thirty and not more than seventy nanometers.

16. The method of claim 1 further comprising:
removing a remaining portion of the at least one pole layer separated from the PMR pole after the step of performing the second planarization.

17. The method of claim 1 wherein the first planarization stop layer has is substantially flat in a device region and a field region.

18. The method of claim 1 wherein the second planarization stop layer has is substantially flat in a device region and a field region.

19. The method of claim 1 wherein the step of providing write gap is performed before the first planarization stop layer is provided.

20. A method for providing a perpendicular magnetic recording (PMR) transducer including a PMR pole formed from at least one pole layer, the method comprising;
providing a first chemical mechanical planarization (CMP) stop layer on the at least one pole layer, the first CMP stop layer including at least one of Ru, Ta, and Ti;
providing a second CMP stop layer on the first CMP stop layer, the second CMP stop layer including at least one of SiC and diamond-like carbon;
providing a mask on the second CMP stop layer, a first portion of the mask residing on a portion of the at least one pole layer from which the PMR pole is formed;
defining the PMR pole after the mask is provided;
providing an intermediate layer on the PMR pole, the intermediate layer substantially surrounding at least the PMR pole;
performing a first CMP on at least the intermediate layer, a first portion of the second CMP stop layer being removed during the first CMP, a second portion of the second CMP stop layer remaining after the first CMP;
removing the second portion of the second CMP stop layer;
performing a second CMP, at least a portion of the first CMP stop layer remaining after the second CMP is performed;
removing a remaining portion of the at least one pole layer separated from the PMR pole after the step of performing the second CMP;
providing a write gap on the PMR pole; and
providing a shield on the write gap.

* * * * *